Jan. 25, 1966  E. C. STARBUCK ETAL  3,231,135
DISPENSING CONTROL APPARATUS HAVING PLURAL COUNTERS
Filed Dec. 30, 1963  5 Sheets-Sheet 1

INVENTORS
Al Siamon
Elbert C. Starbuck

By Smyth, Roston & Pavitt
Attorneys

INVENTORS:
Al Siamon
Elbert C. Starbuck

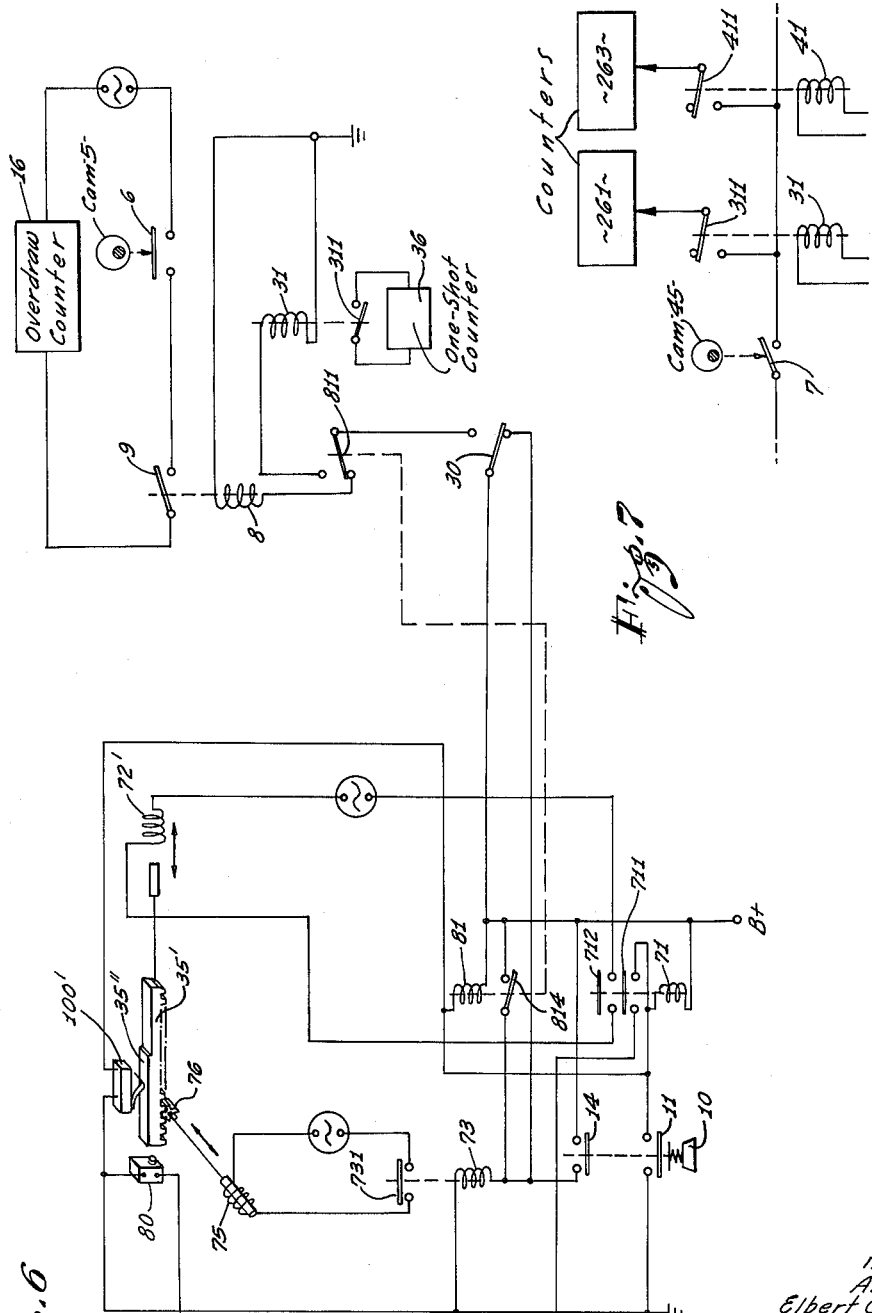

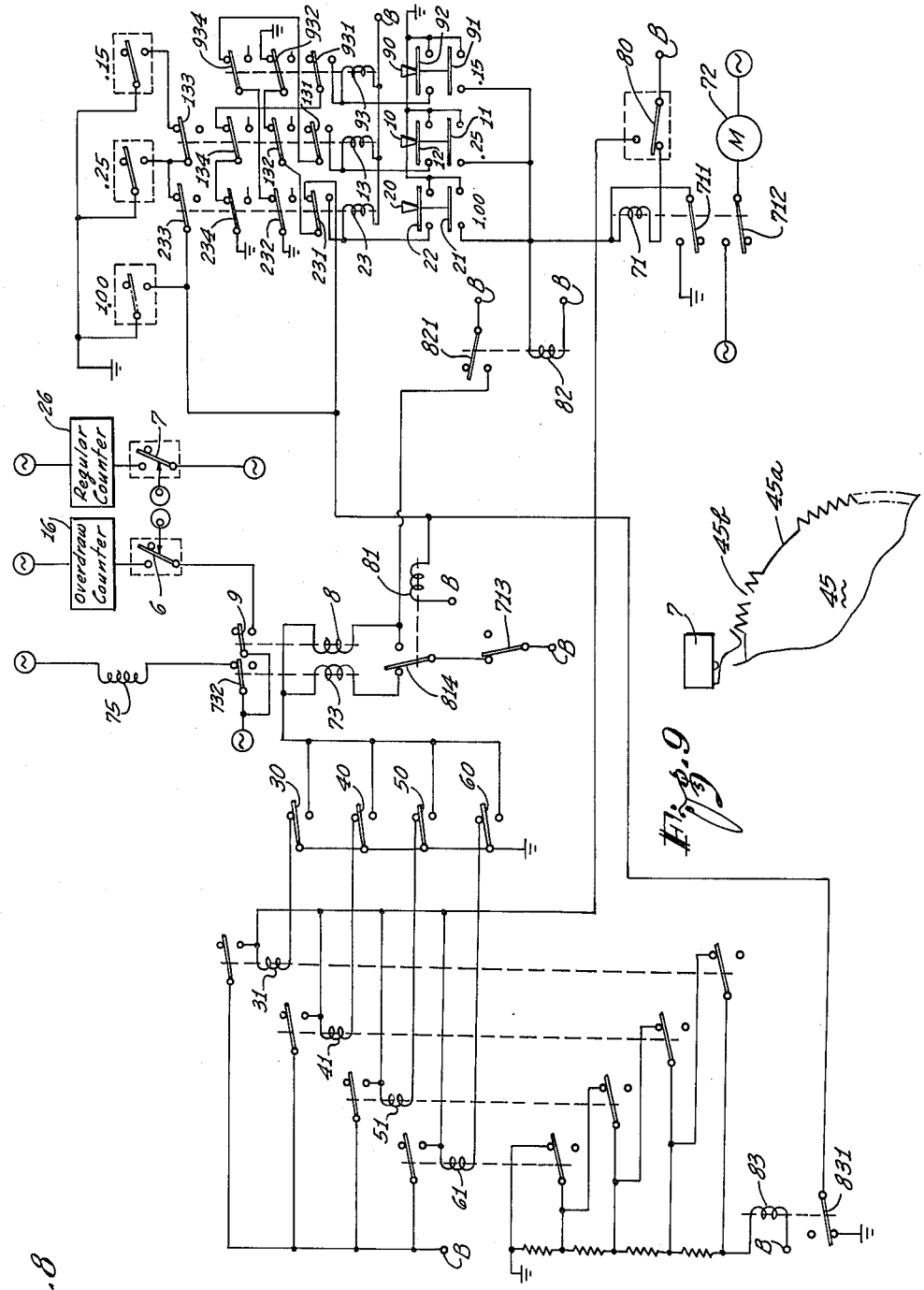

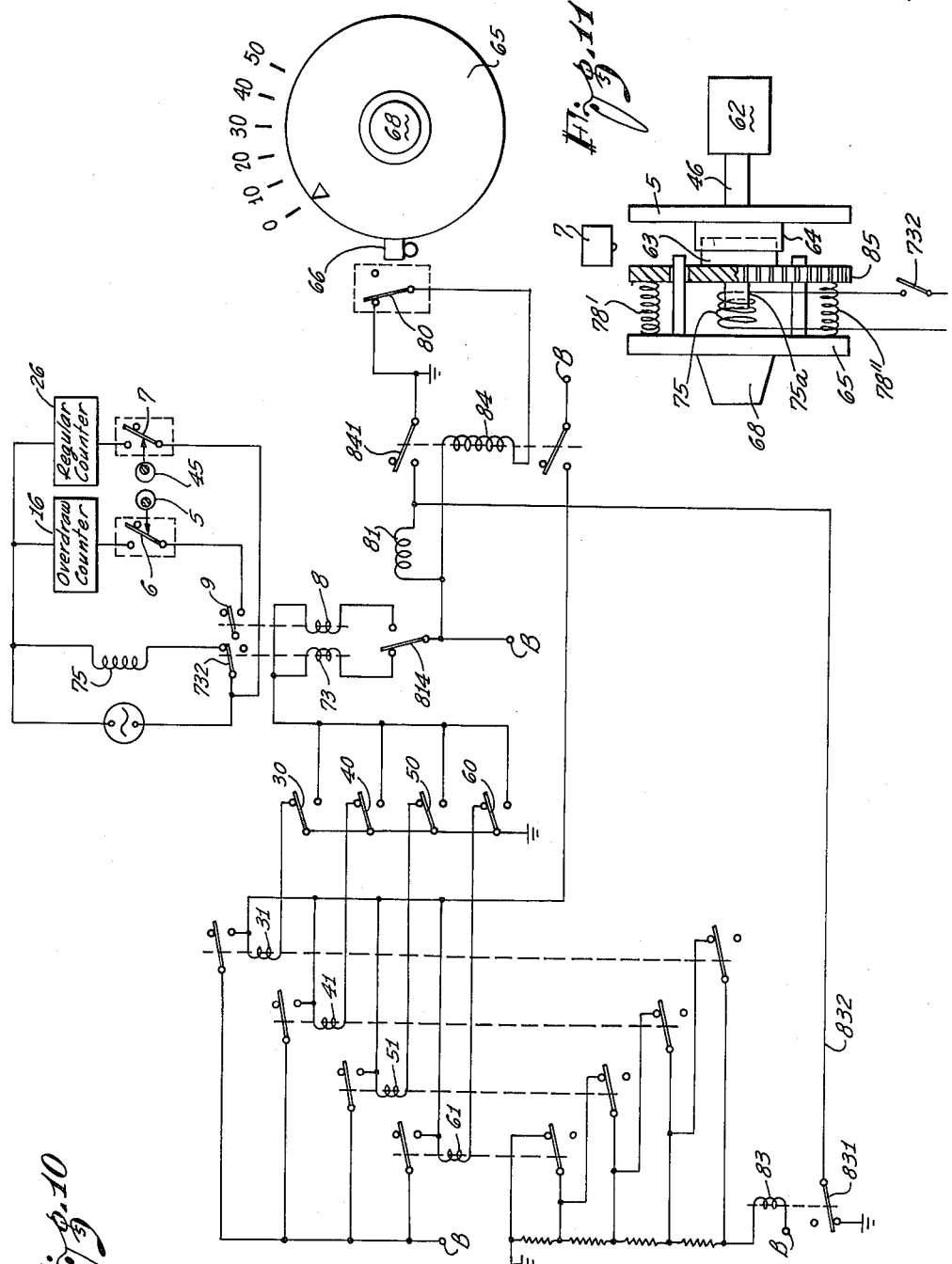

з,231,135
Patented Jan. 25, 1966

3,231,135
DISPENSING CONTROL APPARATUS HAVING PLURAL COUNTERS
Elbert C. Starbuck, 8544 Eton Ave., Canoga Park, Calif., and Al Siamon, 7661 Alcove St., North Hollywood, Calif.
Filed Dec. 30, 1963, Ser. No. 334,170
16 Claims. (Cl. 222—26)

This invention relates to an apparatus for supervising manually controlled dispensing of a medium under pressure.

Usually, flow meters supervise and meter the discharge of liquid from a storage tank. However, a flow meter is useful only if the liquid it measures has a low viscosity and does not chemically decompose or precipitate dissolved components. For example, a sugary beverage is likely to precipitate sugar; and such sugar will soon be deposited at narrow ducts, at the container walls, and particularly at the mechanically moving parts of the flow meter such as the vanes. Such deposits will soon alter critical diameters and calibrated distances within the flow meter so that, in effect, frequent cleaning of the flow meter is necessary to retain its usefulness. Similarly, the flow of granular or powdery material can only be metered directly if such material is completely dry, for otherwise deposits will soon clog the flow meter.

In the field of supervising the dispensing of liquids, it is often necessary to be sure that definite quantities of liquids are being discharged from a storage tank without wasting even small amounts, and that each such definite quantity is being accounted for. For example, in restaurants the dispensing of beverages, such as soft drinks or beer, should be carried out in definite quantities without incurring overflow. Furthermore, it is desired to establish a record of any regularly dispensed fixed quantity so that a continuous control is being afforded, not only to indicate that regular amounts of liquid have been dispensed without overflow, but also that any regularly dispensed quantity of liquid is being charged. Similar problems arise where definite quantities of liquids or powders have to be mixed by manual operation.

It is an object of the present invention to facilitate the supervising of the dispensing of definite quantities of a medium under pressure. It is a primary feature of the present invention to make use of the fact that any liquid under constant pressure will discharge through an opening by similar quantities per time unit, so that, for such a medium, a definite quantity permitted to be discharged can be determined by a time interval during which the discharge outlet is being kept open. In other words, it is a feature of the present invention to indirectly supervise the flow of a medium under pressure by determining the time during which a discharge opening or outlet is being kept open.

According to one aspect of the present invention in a preferred embodiment thereof, it is suggested to provide two different counters. Each counter is connectible to a source of pulses. One of the counters will, in the following description, be designated an overdraw counter, which overdraw counter is to be connected to a pulse source whenever the medium under pressure is being discharged irregularly. The other counter is to be connected to a pulse source whenever liquid is being properly dispensed. A switch is provided for concurrent actuation with a tap, valve, etc., controlling the discharge of liquid, or any other medium, under pressure from a tank. A time-interval selector or preparatory switch is provided to be actuated prior to any tap actuation. A circuit network connects the time-interval selector to the tap switch in such a manner that any tap-switch actuation duly preceded by a time-interval selection will connect the regular counter to its pulse source for a definite period of time. Actuation of the tap switch without prior selector actuation, or any continued tap-switch actuation beyond the permitted interval, automatically connects the overdraw counter to its pulse source.

The inventive combination insures that any regular dispensing of liquid or powder is being recorded in the regular counter, while any irregular dispensing of liquid or powder is registered in the overdraw counter.

The regular counter can be replaced by a simple relay register, just marking every regular tap-switch actuation. The supervising network can accommodate any number of taps and tap switches, and provision is made to detect concurrent actuation of two or more taps.

The invention finds utility wherever a medium under pressure is to be dispensed in predeterminable quantities from a storage tank, bin, barrel, etc.; such a medium can be a liquid, a gas, or powder—for example, "beer on tap" served in a restaurant or bar, or soft drinks. Manually controlled mixing operations of liquids, gases and/or powder can also be supervised by means of the invention. Gasoline pumps can be equipped with one of the devices described below.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIG. 6 illustrates a circuit diagram of a simplified embodiment of the present invention;

FIG. 7 illustrates a modification of the circuit network shown in FIG. 2;

FIG. 8 illustrates a detailed circuit diagram of an embodiment of the invention permitting a larger number of selections and a modified tap-switch control as compared with the network illustrated in FIG. 2;

FIG. 9 illustrates a side elevation of a portion of the cam disk shown in FIG. 4, but modified to accommodate the network shown in FIG. 8;

FIG. 10 illustrates schematically a modification of the circuit network illustrated in FIG. 8, permitting setting of various time intervals for regular dispensing; and FIG. 11 illustrates a side elevation, partially in cross section, of the selector switch used in the device illustrated in FIG. 10.

Figure 1:
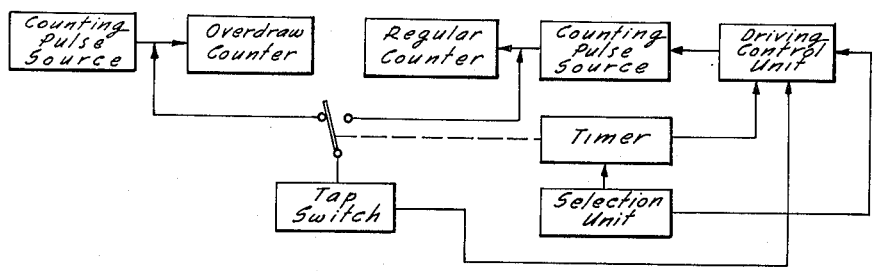
FIG. 1 illustrates a block diagram of the principal embodiment of the present invention.

Proceeding now to the detailed description of the drawings, in FIG. 1 there are schematically illustrated two counters, one being designated an overdraw counter and the other being labeled a regular counter. A tap switch selectively connects counting-pulse sources to either the overdraw counter or to the regular counter. The latter connection is determined by a timer unit which is controlled by a selection unit. Actuation of both the selection unit and the tap switch is required so that a driving control unit can enable the counting-pulse source destined to feed pulses to be counted to the regular counter. Aside from governing the effective path of tap-switch actuation, the timer also disables the driving control unit whenever a time interval has elapsed as was determined by the selection unit. The selection unit will also reset the timer unit to zero, if necessary.

The driving control unit, selection unit, and timer unit cooperate with each other in that actuation of the tap switch causes the regular counter to respond only if a selection has been made previously. Without such a prior selection, or if a selected period of time has elapsed after a proper previous selection, any tap-switch actuation is monitored exclusively by the overdraw counter.

For convenience, the embodiments of the present invention will be described hereafter in connection with the dispensing of a beverage from a tap or taps. It is to be understood, however, that the various electrical and mechanical components and their cooperation do not depend on the kind of material dispensed by a tap, valve, or the like.

Figure 2:
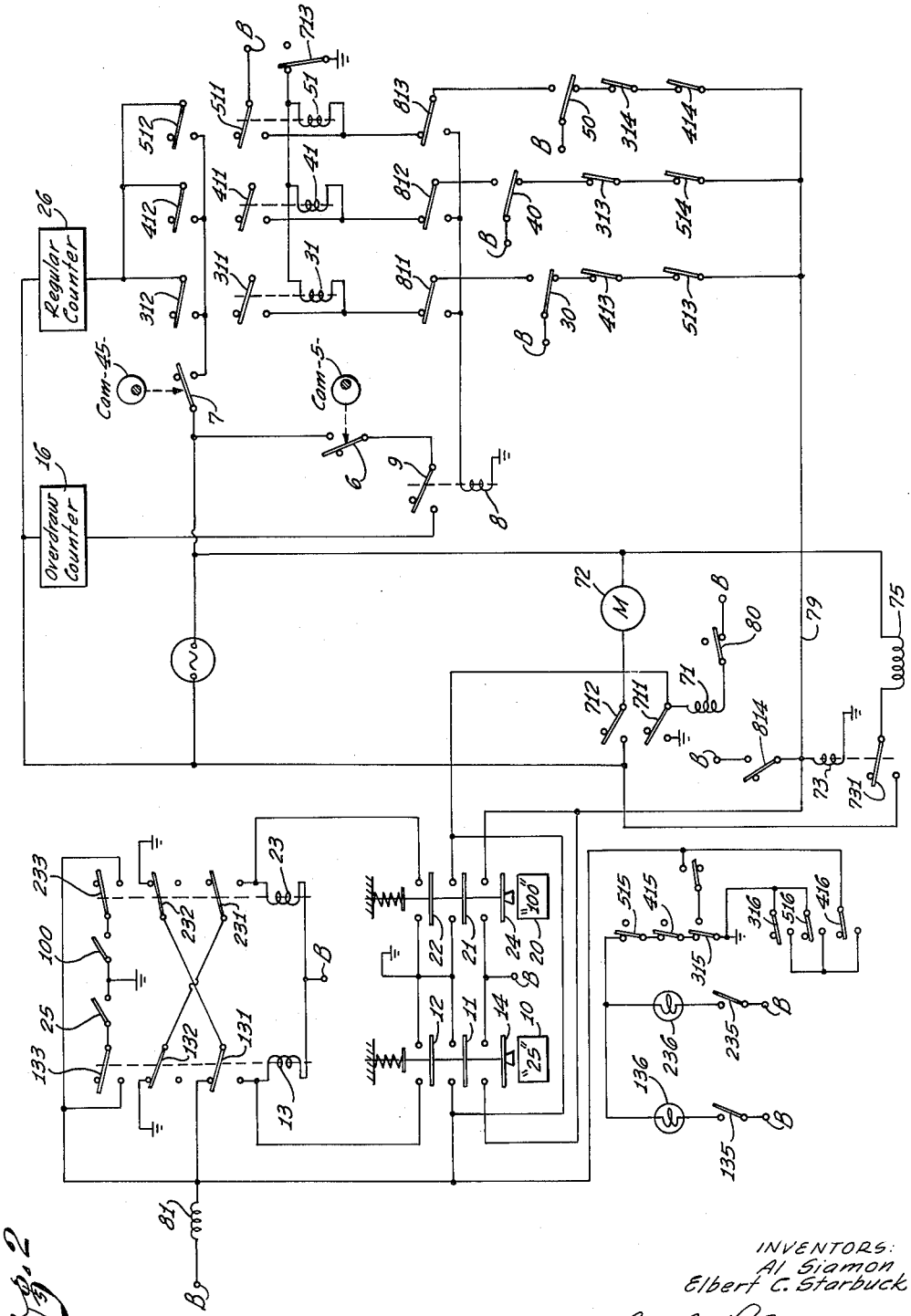
FIG. 2 illustrates a detailed circuit diagram of a first embodiment of the present invention, including a network for supervising three liquid-dispensing taps for two different quantities.

Proceeding now to the description of FIGS. 2, 3, 4 and 5, particularly in FIG. 2, there is first shown a selection unit comprising two push buttons 10 and 20 for two selector switches. Push buttons 10 and 20 have contact blades 11 and 21, respectively, for individually connecting ground potential to a relay 81 having its other side permanently connected to a source of low-voltage potential B. Relay 81 is the principal component of the timer unit and will be called a timed relay. Contact blades 12 and 22 of the two selector switches individually connect ground potential to two selection relays 13 and 23. Contact blades 14 and 24 of the two selector switches individually and jointly connect the B potential to a line 79 for utilization as will be described more fully below.

The push buttons 10 and 20 of the two selector switches are spring biased so that contact is made only during respective actuation, and conventional coil springs return the push buttons into a neutral position after release thereof. The neutral position is defined by all of the blades 11, 12, 14, 21, 22, and 24 being open.

Selection relay 13 controls three blades 131, 132, and 133, whereas selection relay 23 controls three blades 231, 232, and 233. Blades 131 and 232 define an energizing circuit for timed relay 81 as long as both relays 13 and 23 are being de-energized. Additionally, blade 131, when actuated, defines a holding circuit for relay 13, which holding circuit will be interrupted by blade 232 upon energization of relay 23. Similarly, upon energization of relay 23, blade 231 defines a holding circuit for relay 23, which holding circuit will be interrupted when button 10 is pressed and energized relay 13 actuates its blade 132.

Figure 3:
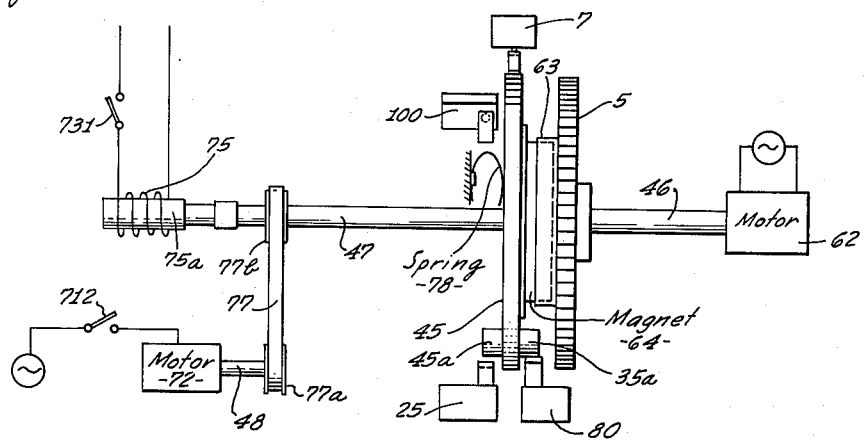
FIG. 3 illustrates somewhat schematically a side view of several mechanical control elements employed in the embodiment illustrated in FIG. 2.
Figure 4:
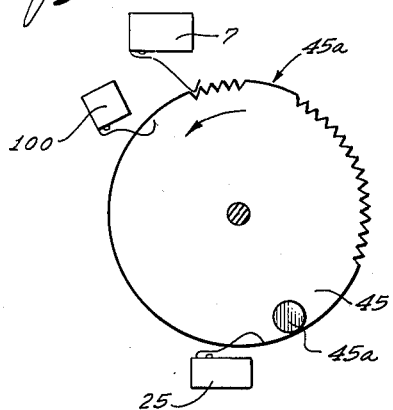
FIGS. 4 and 5 illustrate side elevations of a cam disk designed to determine critical periods of time for relay and counter operation of the embodiment illustrated in FIGS. 2 and 3.
Figure 5:
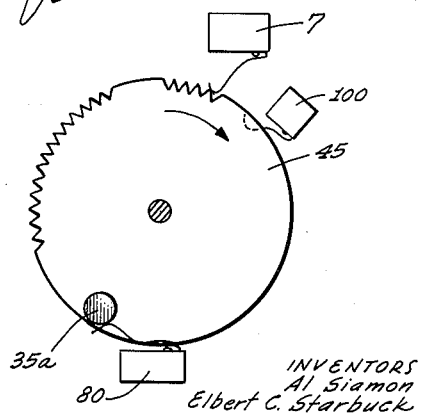

Blades 133 and 233 effectively connect limit switches 25 and 100 in series with relay 81. Turning now specifically to FIG. 3, the limit switches 25 and 100 are stationarily positioned to cooperate with a lug 45a on a cam disk 45. The limit switches 25 and 100 are actuated by lug 45a after two different periods of time have elapsed, measured from the commencement of rotation of the disk which is shown in zero position. Thus limit switches 25 and 100 are open when disk 45 is in zero position. Disk 45 rotates for timer operation in the direction of the arrow, and after predetermined periods of time, switches 25 and 100 close. The effect of this cam operation will be explained more fully below with reference to FIG. 2. Disk 45 further has a lug 35a destined to cooperate with a stop-return limit switch 80. Lug 35a opens limit switch 80 whenever (1) disk 45 is in zero position, (2) solenoid coil 75 is energized. Hence, switch 80 is closed whenever lug 35a is either axially or radially displaced. Cam disk 45 has two series of notches on its circumference, which notches are separated by a space designated with reference numeral 45c. The notches on the circumference of cam disk 45 actuate a stationary limit switch 7, which, as will be explained more fully below, constitutes the pulse source for the regular counter.

Disk 45 is mounted on a shaft 47, which is axially displaceable. There are two different axially operating positions of shaft 47; in one such position, shaft 47 is drivingly connected to a shaft 46, which is being continuously driven by a clock motor 62. The driving connection is being made by a clutch comprising a magnet-armature arrangement, with one magnet or armature 63 being secured to the front end of shaft 46, while the other magnet or armature 64 is secured to the front end of shaft 47. A spring 78 urges shaft 47 towards the right and the two magnets into driving engagement; a solenoid coil 75, when energized, pulls shaft 47 away from the driving engagement with shaft 46. For this purpose, a yoke, armature, or plunger 75a is mounted on or is integral with shaft 47.

It is an important feature that the cams on disk 45 are always in the range of limit switches 25 and 100, regardless of the specific axial position of disk 45. Also, disk 45 is always in the scanning range of limit switch 7, so that any axial movement of disk 45 does not actuate switch 7.

A driving engagement between shaft 47 and a shaft 48 is established, there being a gear wheel 77a on shaft 48, a gear wheel 77b on shaft 47, and a notched belt for drivingly connecting the gear wheels 77a and 77b. However, shaft 48 is not being driven continuously. There is provided a motor 72, which can also be called a return motor, that is controlled in a manner as will be described more fully below.

A cam disk 5 is mounted on shaft 46 for continuous rotation therewith. A limit switch 6 scans the notched circumference of cam disk 5, which arrangement constitutes the source of counting pulses for the overdraw counter.

Returning to FIG. 2, it can be seen that the regular counter, designated by reference numeral 26, is connected between the terminals of an A.C. voltage source, whereby one connection line is governed by the contact blade of limit switch 7, which is being actuated by cam 45. Either one of three blades 312, 412, or 512 can connect the blade of limit switch 7 to the regular counter 26. Blades 312, 412, and 512 are governed by relays 31, 41, and 51, respectively, which will hereafter be called tap relays. Each tap relay has a holding blade 311, 411, and 511, respectively, connecting the respective tap relay coil to potential B upon energization of the corresponding tap relay. The holding circuits of all tap relays are governed by a blade 713 pertaining to a return relay 71, which return relay is connectible between ground and potential B upon actuation of either push button 10 or 20. Return relay 71 cannot be actuated as long as disk 45 is in zero position, since in that position lug 35a opens limit switch 80, which, in turn, opens the energizing circuit for return relay 71. Conversely, as long as relay 71 is energized, blade 713 is in the alternative position with respect to the position illustrated.

The tap relays 31, 41, and 51 are individually governed by tap switches 30, 40, and 50, capable of individually connecting B potential to the tap relay to which they pertain. Each tap relay 31, 41, and 51 has two additional contacts for blocking the respective two other energizing circuits. Thus, tap relay 31 has two additional blades 313 and 314, respectively, connected in series with the coils of tap relays 41 and 51, respectively. Tap relay 41 has two blades 413 and 414 connected in series with the coils of tap relays 31 and 51. Tap relay 51 has two contact blades 513 and 514, respectively, connected in series with the coils of tap relays 31 and 41.

It will be appreciated that the blades 413 and 513 additionally govern application of B potential through unactuated tap switch 30 to line 79, and from there to clutch and solenoid control relay 73. The same holds true for blades 313 and 514 as cooperating with tap switch 40; and blades 314 and 414 cooperate with tap switch 50 in a similar manner.

The electric current paths from tap switches 30, 40, and 50 to tap relays 31, 41, and 51, respectively, are individually governed by relay blades 811, 812, and 813, operated in unison by the timed relay 81. Only when relay 81 is not being energized, blades 811, 812, and 813 connect the tap switches to the tap relays. Whenever relay 81 is energized, the tap switches 30, 40, and 50 are being connected to the overdraw relay 8 governing a blade 9 which is connected in series with an A.C. voltage source, limit switch 6, and overdraw counter 16. Accordingly, the position of blades 811, 812, and 813 determines whether the actuation of any tap switch connects the B potential to overdraw relay 8 or to the tap relays, which, in turn, govern the input side of the regular counter 26.

The clutch and solenoid control relay 73 can additionally be connected to B potential through a blade 814 governed by timed relay 81. Relay 73 itself governs a blade 731 connected in series with solenoid coil 75. It will be recalled that, as long as coil 75 is energized, cam 45 is being decoupled from cam 5, so that cam disk 45 is either at rest or in the process of being returned. The return of cam disk 45 into zero position is carried out by the motor 72, which is controlled by a return relay 71, and particularly the blade 712 thereof. Blade 711 of relay 71 establishes a holding circuit for the return relay 71. Initial energization of relay 71 is had through either blade 11 or blade 21 of the selection unit.

The tap relays additionally operate contact blades 315, 316, 416, 516, and 517 to avoid regular counting of concurrent dispensing through two or three taps.

The circuit network illustrated in FIG. 2 is completed by a signaling device, which includes two lamps 136 and 236 which, respectively, light up whenever one of the selection relays 13 and 23 is being energized. Accordingly, these latter two relays have one additional contact blade each, respectively denoted with reference numerals 135 and 235 and individually governing the circuit to the two lamps.

The tap relays have additional contacts 315, 415, and 515 which operate in series, so that actuation of any tap turns the respective light off.

Before proceeding to the description of the over-all operation of the system illustrated in FIGS. 2, 3, 4, and 5, several operational elements will be more fully characterized with regard to their intended function.

*The timed relay 81*

The principal function of timed relay 81 is to be seen in disconnecting the overdraw relay 8 from the tap switches for selected periods of time. The network is wired so that timed relay 81 is being de-energized during such selected periods of time only. At all other times, the relay 81 will be energized to effectively connect the tap switches 30, 40, and 50 to the overdraw relay 8 through blades 811, 812, and 813. Relay 81 can be energized even when neither button 10 nor 20 has been pressed, but as long as no holding circuit for any selection relay has been established. Thence, relay 81 receives current through blades 131 and 232 in the illustrated position. Relay 81 can further be energized (1) upon pressing of either button 10 or 20 without releasing same, (2) by closing of limit switch 25 when selection relay 13 is energized, (3) by closing of limit switch 100 when selection relay 23 is being energized, (4) through pairs of closed blades selected from the five blades 315, 316, 416, 516, and 517.

De-energization of the timed relay 81 requires two operating steps. First, a selection with either button 10 or 20 must have been made, and such a button must have been released, because only then can relay 81 be governed by any of the limit switches 25 and 100. Second, cam disk 45 must have been rotated to remove lug 45a from switches 25 and 100. Without such a removal, limit switch 25 or 100 cannot be opened for de-energization of relay 81.

There are provided safety features which cause timed relay 81 to respond even if properly de-energized during any draw. For example, any concurrent actuation of more than one tap switch establishes an energization circuit for relay 81. Any pressing of a selector button energizes the relay 81. Hence, a concurrent operation of two or more tap switches or of a tap switch and a selector button causes the timed relay 81 to respond, and the overdraw relay and counter will be actuated.

*The solenoid 75*

The solenoid 75 and its operating and controlling relay 73 serve to control the position of cam disk 45 in relation to cam disk 5 and motor 62. Accordingly, the principal function of control relay 73 is to prevent coupling of disk 45 to motor 62 for actuation of limit switch 7 unless there has been a proper sequence of steps: (1) selection by buttons 10 and 20, (2) release of the selected button, and (3) operation of one tap switch. Coupling of disk 45 to motor 62 for common rotation to pulsate switch 7 requires de-energization of the solenoid 75. Accordingly, energizing circuits for solenoid control relay 73 are established by pressing of either one of the selector buttons 10 or 20. Also, as long as all tap switches are inactive, potential B is applied directly to clutch relay 73 through the closed set of blades 413, 513; 313, 515; or 314, 414. Finally, an energizing circuit for control relay 73 will be established as soon and as long as timed relay 81 is energized for any reason. Energization of relay 81 places blade 814 into the right position, applying potential B to relay 73.

Thus, it will be appreciated that relays 81 and 73 are interlocked in preventing disconnection of overdraw relay 8 from the tap switches unless a proper sequence of steps has been performed and one tap switch has been actuated only for a limited period of time.

*Timer disks 5 and 45*

The timer disk 45 cooperates with limit switch 7 and with limit switches 25 and 100. In order to operate limit switch 7 effectively, it is mandatory that the solenoid 75 is de-energized so that disks 45 and 5 rotate in unison. Thus, the solenoid 75 must always pull disk 45 away from disk 5 whenever a new selection has not been made either after an initial plugging in or after an actuation of a tap switch. Disk 45 will not engage disk 5 unless a selection has been made and a tap switch has been pressed thereafter.

The lug 45a on disk 45 is destined to close limit switches 25 and 100 at particular positions off the zero position thereof and commensurate to a particular distance that disk 45 has been rotated at constant speed by the clock motor 62. The limit switches 25 and 100 are, of course, open when disk 45 is in zero position. Now, when disk 45 rotates in unison with disk 5, switches 25 and 100 are to be open for prescribed angular distances measured from the zero position.

The regular counter 26 has as its input the pulses derived from limit switch 7. Limit switch 7 is being actuated by cam disk 45, and disk 45 is drivingly coupled to a shaft 46 and motor 62. Whenever solenoid 75 is energized, cam disk 45 will rotate only through return motor 72. This will happen only when either button 10 or 20 is pressed to energize return relay 71, thereby preventing tap relays 31, 41, and 51 from energization through blade 713. Thus, any actuation of switch 7 by the returning disk 45 will not be registered, since blades 312, 412, and 512 are open. Thus, the premise that switch 7 will not affect the regular counter 26, unless a selection has been made and the selected amount has not been exceeded, is still correct, since the pulsations of switch 7 during return remain ineffective due to the blocking action by energized return relay 71 upon blades 312, 412, and 512. Whenever solenoid 75 is indeed unenergized so that cam disk 45 rotates in unison with shaft 46 and cam disk 5, limit switch 7 will at first be actuated five times, and five counting pulses will thus be fed to counter 26. It has been found advisable to use these five pulses in that each pulse represents a nickel, so that, after these five pulses, the regular counter 26 has added 25 cents. As can be seen from FIG. 4, after these five notches, there is a certain area, 45c, in which the regular counter will not receive any pulses. This area is provided to permit individual adaptation to a different price. For example, the smallest quantity of beer sold in a glass is usually 25 cents, but in some instances the same quantity is being charged with 30 cents, in which case one simply has to add another notch. Also, the area 45c is provided to permit safe axial retraction of disk 45 by energized solenoid 75 whenever the 25-cent selection is being made without additional actuation of limit switch 7.

Area 45c separates the five notches from fifteen additional notches which come into effect at the $1.00 selection, in which case the regular counter will receive altogether twenty pulses. It will be appreciated that additional notches can be provided in case a large unit is being charged with a higher amount of money.

PHASES OF OPERATION

In the following description, various phases of operation will be explained.

(A) *Tap operation without selection.*—If a bartender operates one of the tap switches—for example, 30—to draw liquid without having made a selection previously, then the overdraw relay 8 responds, since tap switch 30 places voltage source terminal B through contact 811 to the coil of overdraw relay 8. Accordingly, contact 9 connects the operating contact blade of limit switch 6 to the overdraw counter 16, and timer cam 5 pulsates switch 6 so that counting is had in the overdraw counter 16. Counting in the overdraw counter continues until tap switch 30 is opened, whereupon overdraw relay 8 is being de-energized and the overdraw counter 16 ceases to respond. Whenever timed relay 81 is energized, the timed relay contacts 811, 812, and 813 are in the lower position, so that any operation of any of the tap switches 30, 40, or 50 is sure to cause overdraw relay 8 to respond, with tap relays 31, 41, and 51 remaining unenergized.

(B) *25-cent selection.*—Upon pressing selection button 10, contact 12 connects ground to selection relay 13, which responds and establishes a holding circuit through its blade 131. Relay 13 thus remains energized after release of button 10, but as long as button 10 is being pressed, a direct energization circuit for relay 81 is established. Blade 131 furthermore interrupts one energization circuit for relay 81. Blade 132 prevents any establishing of a holding circuit for relay 23 as long as relay 13 remains energized, and blade 132 interrupts such a holding circuit if there has been one. Blade 133 connects the limit switch contact 25 to relay 81.

Upon release of button 10, all of the energizing circuits for relay 81 are being interrupted, and de-energized relay 81 changes the position of blades 811, 812, and 813 to an upward position to connect tap relays 31, 41, and 51, respectively, to tap switches 30, 40, and 50. Blade 814 is shifted to the left to interrupt one of the energization circuits for relay 73. After release of button 10, control relay 73 may be de-energized through any of the tap switches 30, 40, or 50.

(C) *Timer return.*—Upon pressing of any selector button, 10 or 20, either blade 11 or 21 applies the ground potential to return relay 71, lowering its blades 711 and 712 accordingly, and shifting relay blade 173 to the right. Blade 711 establishes a holding circuit for return relay 71; blade 712 actuates return motor 72, and blade 713 interrupts any previously established holding circuit for tap relays 31, 41, and 51. Return motor 72 moves cam disk 45 rapidly back into zero position. The concurrent pulsations of switch 7 are not registered because blades 312, 412, and 512 are being opened. Upon reaching zero position, lug 35a operates the return stop limit switch 80, interrupting the holding circuit for return relay 71. When relay 71 drops, tap relays 31, 41, and 51 are being reconnected to ground, and motor 72 is being stopped. Concurrently with the return of the timer to zero, limit switches 25 and 100 are opened again so that, upon release of selector button 10 or 20, timed relay 81 becomes de-energized as aforedescribed and moves blades 811, 812, 813, and 814 into the illustrated positions, thus indicating that a selection has been made.

Timer disk 45, when returning to zero, interrupts an energization circuit for relay 81, which permits de-energization of solenoid control relay 73. Thus, immediately succeeding the return of disk 45 to zero position for a new selection, solenoid 75 can be de-energized by any tap-switch actuation to permit engagement of cam disk 45 with disk 5 and motor 62.

Accordingly, one can distinguish between two important periods of time. The first period commences upon the pressing of any selector button 10 or 20, whereby the return relay 71 and return motor 72 rather rapidly return cam disk 45 to zero position. Relay 81 de-energizes and places contact blades 811, 812, 813, and 814 into the illustrated positions. During this first but indefinite period of time, the overdraw relay 8 will not respond unless two tap switches are being actuated or the selector button is not being released. De-energization of solenoid 75 can occur only upon release of push button 10 or 20, since either one of the latter applies potential directly to solenoid control relay 73. The first period of time ends upon pressing of either tap switch, whereby the second important period of time commences to run. This second period of time is definite, and its length is solely determined by the timer disk 35.

(D) *Proper tap actuation after $1.00 selection.*—After selection and completed return of disk 45 to zero position, any of the tap switches 30, 40, or 50—for example, 40—may be operated, connecting source terminal B through blade 812 in upper position to tap relay 41. Relay 41 responds and moves its contact blades 411 and 412 into the lower position. Now blade 412 effectively connects money counter blade 7 (as operated by cam 45) to money counter 26. Relay 41 furthermore opens contact blades 413 and 414, whereupon solenoid coil 75 is being de-energized, shifting disk 45 into driving engagement with cam 5 and motor 62 to rotate now in unison. The notches on disk 45 now operate limit switch contact 7, and counter 26 will count a number of pulsations of blade 7 as produced by the notches on disk 45. These pulsations are being transferred due to the closed position of blade 412. After counting "25 cents" in counter 26, disk 45 continues to rotate with disk 5, but there is a pause, in which pause timed relay 81 will not respond even though limit switch 25 closes. Since it is assumed that a $1.00 selection has been made, relay 23 is energized and blade 233 closed, but not blade 133. After fifteen further notch-counts, the regular counter 26 has been advanced by $1.00, and now limit switch 100 will drop. Relay 81 will respond, placing all of its contacts in operating position again. Among others, blade 812 will drop. If tap switch 40 continues to be operated, immediately overdraw relay 8 responds, and any pulsations of blade 6 are being transmitted through closed contact blade 9 to overdraw counter 16. Simultaneously, blade 814 is shifted to the right, re-energizing solenoid control relay 73, and solenoid 75 responds, pulling cam disk 45 away and out of engagement with the driving motor for cam disk 5. Accordingly, blade 7 ceases to pulsate. Unless and until a further selection is made, relays 81 and 73 remain energized, and disk 45 stops in an off-zero position maintaining switch 100 closed.

Double check

Assuming any of the selector buttons has been pressed and released again so that relay blades 811, 812, and 813 are in upper position, relay 81 is being de-energized. If any two tap switches—30 and 40, or 30 and 50, or 40 and 50—are now being operated simultaneously, counter 26 could register only 25 cents or $1.00, while actually liquid for 50 cents or $2.00 might be drawn. To avoid this, each tap switch has the additional blades 315, 316; 416; 516, 517, respectively interconnected so that closing of two tap switches applies ground directly to relay 81, energizing same so that blades 811, 812, and 813 drop, and overdraw counter 16 responds immediately. Concurrent or overlapping actuation of tap switches 30 and 40 connects relay 81 to ground through blades 316 and 416; concurrent or overlapping actuation of tap switches 40 and 50 connects relay 81 to ground through blades 416 and 516; concurrent or overlapping actuation of tap switches 30 and 50 connects relay 81 to ground through blades 315 and 517.

Counter operation in general

The system as described is provided with two counters, one called overdraw counter and the other called regular counter. The pulse source for the overdraw counter 16 is cam disk 5 cooperating with limit switch 6. This pulse source produces continuously a train of pulses which, in effect, measures time. Whenever any of the tap switches is being actuated irregularly, the overdraw relay 8, through its blade 9, connects the continuously actuated limit switch 6 to the overdraw counter 16. Accordingly, overdraw counter 16 indicates from an arbitrarily determined starting point how long any of the taps has been opened, over and beyond any period of time registered by the regular counter. Since the medium discharged through any of the taps is under constant pressure, the counting result, as indicated cumulatively by overdraw counter 16, is in direct proportion to the amount of liquid which is either being wasted or stolen. The frequency of the pulses fed to the overdraw counter is basically arbitrary. Of course, the higher the frequency, the more detailed will be the result. In other words, at a very high frequency, even minute portions are being measured. Preferably, one will select a pulse frequency which can be easily handled by a simple mechanical counter, wherein the time elapsing between two succeeding pulses is about proportional to a discharged quantity of liquid, the waste of which can just be tolerated.

From the foregoing description, it will be appreciated that the overdraw counter and the regular counter are effective alternatingly. However, it is a principal feature of the circuit, as described, to have the pulse source for the overdraw counter operating continuously to insure that this pulse source is available all the time. It is imperative that any wasted or stolen quantity of liquid is being measured by the overdraw counter control circuit. The regular counter is to count only quantities of liquid dispensed after proper selection. Naturally, the control circuit for the regular counter is somewhat more complicated because one wants to make sure that only properly selected quantities of liquid are being counted. If for any reason, such as a circuit defect or the like, a regularly dispensed amount of liquid is not being properly counted in the regular counter, no critical problem arises.

Lug 45a on cam disk 45 controls the precise periods of time during which relay 81 is not energized, whereby each such period of time commences with the actuation of any tap switch.

It should be mentioned why a distinction is being made between the train of pulses drawn from the notches on disk 45 and fed to the regular counter and the time intervals as determined by lug 45a on cam disk 45. One reason is that regular counter 26 will have completed its count prior to the response of either limit switch 25 or 100, so that the counting of the proper amount of money is not interrupted if a tap switch is released a trifle early. Also the two possible selections are related in that the amounts of money involved follow the ratio of 1 to 4. The respective quantities dispensed might follow a ratio of 1 to 4.5, or 1 to 5. The latter ratios reflect precisely in the two distances that lug 45a on cam disk 45 has to travel to operate limit switches 25 and 100, respectively.

Before proceeding to the description of FIG. 6, reference is made to FIG. 7, illustrating a modification which is applicable to the network shown in FIG. 2 as well as to networks described below and operating with multiple tap switches.

In FIG. 7, it is shown that each tap relay may govern the input side of individual counters so that the amount of liquid dispensed from any tap can be registered individually. Accordingly, there are shown two counters 261 and 263, respectively connectible to the pulsating microswitch 7 through blades 311 and 411 of tap relays 31 and 41, respectively.

Proceeding now to the description of FIG. 6, previously used reference numerals denote elements performing corresponding functions. There is illustrated a somewhat simplified device showing a single selector push button 10 and a single tap switch 30. The principal function of push button 10 is to energize return relay 71 through switching blade 11 and to temporarily connect the timed relay 81 to the potential B. The contact blade 712, which is actuated by return relay 71, governs the energizing circuit of a solenoid coil 72'. The solenoid 72' has as its principal function the return of the timing unit to zero position. The timing unit comprises a rack 35' capable of meshing a pinion 76, and further having a cam 35". When rack 35" has resumed its zero position, it actuates return-stop limit switch 80, which opens the holding circuit for return relay 71, the latter holding circuit having been established through blade 711 of relay 71. Upon response of limit switch 80 and the resulting de-energization of relay 71, solenoid 72' is disconnected from the voltage source.

Selector button 10 has a second blade 14 temporarily connecting solenoid control relay 73 to potential B. After actuation of a push button 10 and release thereof, the timer unit is, in fact, in zero position, wherein limit switch 100' is kept open by cam 35". Relay 73 is still energized through the unactuated tap switch 30. As long as relay 73 is energized solenoid 75 keeps pinion 76 out of engagement with rack 35', and concurrently the pinion 76 is kept from driving engagement with cam 5. Upon de-energization of relay 73, solenoid 75 is de-energized accordingly, and a driving connection is established between cam 5, pinion 76, and rack 35'.

After actuation of push button 10 and release thereof, blade 814 is open, and blade 14 is open, so that indeed clutch relay 73 will now be governed solely by tap switch 30. Upon subsequent actuation of tap switch 30, the resulting de-energization of solenoid 75 starts the timer to run. As long as timed relay 81 remains unenergized, actuated tap switch 30 connects tap relay 31 to the voltage source through blade 811, then in upper position. Tap relay 31 actuates a contact 311 governing the input of a one-shot counter 36—for example, of the ratchet-wheel type—so that every single response of blade 311 advances the counter 36 by just one step. Another counting step requires release of relay 31 and re-energization thereof.

After cam 35" of traveling rack 35' closes limit switch 100', relay 81 responds and immediately places blade 811 to reconnect tap switch 30 to overdraw relay 8, as aforedescribed; also, blade 814 re-energizes relay 73, and solenoid 75 pulls pinion 76 away from rack 35' and out of driving engagement with disk 5. Rack 35' will not yet return to zero, since, for such a return, actuation of push button 10 is required.

Operation of tap switch 30 without prior actuation of push button 10 finds relay 81 energized through the then closed limit switch 100', so that blade 811 connects actuated tap switch 30 to overdraw relay 8, and the overdraw counter 16 responds as aforedescribed. Accordingly, from the response of limit switch 100′ to the next actuation of push button 10, any actuation of tap switch 30 causes overdraw relay 8 to respond as aforedescribed.

This simplified embodiment does not require a return motor or a cam disk such as 45 of the previously described embodiment. Of course, there is provided a clock motor, continuously driving cam disk 5 as aforedescribed. Said pinion 76 serves for temporarily establishing a driving connection between the clock motor and rack 35′. Conventional means are employed for such a purpose and do not require elaboration.

Proceeding now to the description of FIG. 8, there is shown a circuit network accommodating three price and time selections and four taps. Many principal features of the embodiment illustrated in FIG. 2 have been retained, but the embodiment of FIG. 8 includes significant modifications. The principal modification is that, in the embodiment of FIG. 8, the solenoid control relay connects the solenoid 75 to its voltage source upon relay de-energization. Accordingly, relay 73 is being controlled to be energized only when the regular counter 26 is running.

The selection circuit comprises, in addition, a push button 90, and blade 92 governs initial energization of selection relay 93, while blade 91 energizes return relay 71. Upon tracing the interconnection of blades 231, 232, 234; 131, 132, 134; and 931, 932, 934, one will find that these blades establish holding circuits, with the effect that a holding circuit of but one selection relay can be established, and that any further energization of a selection relay breaks any existing holding circuit. Blades 133 and 233 govern the individual and exclusive connection of limit switches 15, 25, and 100 to one side of timed relay 81. It will be observed that, upon actuation of any selector push button, 10, 20, or 90, one energizing circuit for relay 81 is being interrupted to be re-established by but one of the limit switches 15, 25, or 100.

Either one of the blades 11, 21, or 91 temporarily energizes a relay 82 governing a blade 821 connecting potential B to one side of overdraw relay 8. It will be observed that any actuation of either one of the parallel operating tap switches 30, 40, 50, or 60 will connect ground potential to the other side of overdraw relay 8. Overdraw counting proceeds then as aforedescribed.

Timed relay 81 governs blade 814 in such a manner that it alternatingly applies B potential to overdraw relay 8 or to solenoid control relay 73. Accordingly, the solenoid control relay and the overdraw relay are being enabled in a mutually exclusive manner, with energization proper resulting from actuation of any tap switch. The connection between blade 814 and potential B is governed by a blade 713 pertaining to return relay 71 so that, during return, potential B cannot be applied to either relay 8 or relay 73. The purpose thereof is completion of the return of cam disk 45.

The circuit network governing the return of disk 45 to zero position follows the general pattern outlined in the description of FIG. 2; the mechanical elements correspond to those illustrated in FIG. 3.

As already said above, the tap switches 30 through 60 are operated in parallel for individually applying ground potential to one side of solenoid control relay 73 and overdraw relay 8. The response of either relay is governed exclusively by the position of blade 814. In addition, each tap switch governs a tap relay denoted with reference numerals 31, 41, 51, and 61, respectively. Contrary to the circuit illustrated in FIG. 2, in the embodiment presently described, more than one tap relay can respond simultaneously, but each tap relay governs a shunting blade for short-circuiting a resistor. Four such resistors are connected in series, and they are connected to a relay 83. Normally, all of the resistors are shunted, and relay 83 is energized so that its contact blade 831 disconnects ground potential from a line 832. Line 832 establishes another energizing path for timed relay 81. Whenever two or more tap relays are being energized simultaneously or within overlapping periods of time, two or more resistors will appear as series resistances for relay 83, causing it to de-energize, whereby blade 831 directly connects line 832 to ground; relay 81 responds, and immediately overdraw relay 8 is connected to voltage source B. It will be observed that any concurrent actuation of two or more taps at any time causes the overdraw counter to respond. This holds true regardless of any prior selection properly made. The resistors are dimensioned so that just one of them does not cause relay 83 to de-energize.

It will be observed that solenoid control relay 73 is being energized only if, first, one tap switch is being actuated; second, if relay 81 is being de-energized; and third, if the return of disk 45 has been completed.

The cam disk 45 requires a modification which is illustrated in FIG. 9. On the circumference of disk 45, there are now provided three notches, permitting the counting of three nickels. After a short space designated with reference numeral 45b, there follow two notches succeeded by the aforedescribed space 45c; and fifteen notches follow space 45c, also as aforedescribed. Limit switch 15 is positioned to be actuated by lug 45a slightly prior to the dispensing of 15 cents' worth of beverage.

Proceeding now to the description of FIGS. 10 and 11, there is shown a modification of the embodiment illustrated in FIG. 8 adapted to permit the selection of any amount of money within the limits set by the counting unit for the regular counter 26. There is provided a selector dial 65 having a cam 66, abutting when in zero position a stop 67 and actuating a limit switch 80. Dial 65 is manually operable by a control knob 68. Dial 65 has two or more axially extending pins (see FIG. 11), on which is seated a cam disk 85, similar to disk 5. Springs 78′ and 78″ urge disk 85 into driving engagement with shaft 46 of motor 62, so that disk 85 and dial 65 can be rotated in a direction tending to reset dial 65 and moving cam 66 towards zero position. Energization of solenoid 75 attracts plunger 75a and pulls disk 85 off shaft 46 and out of reach of limit switch 7. Thus, during energization of solenoid 75, dial 65 can be set freely to any suitable value. (See marker on dial 65 and stationary scale.) Solenoid 75 is governed by a blade 732 of relay 73 as aforedescribed. Operation of the timer unit, however, is modified as compared with the embodiments previously described. The time-price setting is being made by turning knob 68, whereby dial 65, cam 66, and disk 85 faithfully follow the adjustment and for a distance proportionally apart from the zero position; limit switch 80 disconnects a relay 84 from the voltage source immediately after cam 66 has left zero position. Blade 841 of relay 84 is thereby being actuated to disconnect timed relay 81 from the voltage source. Timed relay 81 controls blade 814 in a manner described in connection with the description of FIG. 8. That is to say, as long as relay 81 is energized, blade 814 connects B potential to overdraw relay 8, whereas a de-energized relay 81 causes blade 814 to apply B potential to solenoid control relay 73. Any tap switch, when actuated while dial 65 is off the zero position, causes solenoid control relay 73 to be energized, and the solenoid 75 will connect dial 65 and disk 85 to follow the rotation of disk 5, whereby regular counter 26 counts a number of pulses proportionally to the distance that dial 65 and disk 85 have to travel to return to zero position. Upon attaining zero position, cam 66 on dial 65 closes limit switch 80; relay 84 responds, relay 81 responds, and blade 814 changes its position, whereupon solenoid 75 is de-energized and dial 65 and disk 85 cease to rotate.

The network, safeguarding the device against concurrent actuation of two taps, operates as aforedescribed.

It will be appreciated that the various embodiments described above permit, on the one hand, registration of the dispensing of one definite quantity of a medium under pressure through a single tap; on the other hand, any number of taps can be supervised by an integrated circuit network, permitting regular dispensing of any selected quantity of such a medium under pressure.

The embodiments described can be modified in various ways. For example, the utilization of counters as such is not mandatory. It is of primary importance to provide for selective, activatable registration of any wasted medium under pressure, and any regularly dispensed medium is to be registered separately. The specific kind of registration is primarily a matter of convenience, and any known element capable of storing data representing quantities can be used. The inventive embodiments further have been described in connection with the usage of electromechanical relays and with other electrical, electromagnetical, and electromechanical switching and operating elements. Such elements are being suggested primarily for reasons of economy. Wherever it is necessary to register minute quantities, it is necessary to speed up the counting process in the regular counter as well as in the overdraw counter. Accordingly, the frequency of the train of counting pulses as they are fed to the counters will have to be increased with the degree of accuracy desired. It will be understood that, in case of considerably higher frequencies, electronic switching elements will be preferred. It is well within the capability of one skilled in the art to use electronic switching elements, such as flip-flops and gates, in lieu of the illustrated relays. Also, oscillators can be used as pulse sources, and delay lines or other electronic timing units can be used for the control of what was described above as the timed relay.

The invention is not limited to the embodiments described above, but all changes and modifications thereof not constituting departures from the spirit and scope of the invention are intended to be covered by the following claims:

What is claimed is:

1. An indicating system for aiding in the controlling and supervising the dispensing of predeterminable amounts of a medium under pressure, from a storage tank by means of a dispensing valve, comprising:
   first and second counter means;
   electrical pulse-source means;
   switching means connected to and concurrently operated with the medium dispensing valve for connecting said pulse-source means in circuit with said first counter means; and
   time-interval selector means connected in circuit with said switching means for disconnecting said switching means from said first counter means and reconnecting said switching means in circuit with said second counter means for a selected limited period of time.

2. An indicating system for aiding in the controlling and supervising the dispensing of predeterminable amounts of a medium under pressure, from a storage tank by means of a dispensing valve, comprising:
   a time-interval selector;
   first switching means connected to and concurrently operated with the liquid dispensing valve;
   an overdraw registration means;
   second switching means for normally activating said overdraw registration means, and being connectible to said time-interval selector; and
   means for interconnecting said time-interval selector and said first and second switching means for de-activating said overdraw registration means upon actuating of said first switching means for a period of time as selected by said time-interval selector.

3. An indicating system for aiding in the controlling and supervising the dispensing of predeterminable amounts of a medium under pressure, from a storage tank by means of a dispensing tap, comprising:
   a tap switch means connected to the tap and actuated whenever the tap for dispensing a medium under pressure is being actuated;
   an overdraw counter including an enabling circuit connected to be operated by said tap switch when actuated;
   means for generating a source of timed electrical pulses connectible through said enabling circuit to said overdraw counter upon tap-switch actuation;
   a selector switch; a timing circuit connected to be operated by said selector switch for returning same to zero position;
   circuit means interconnecting said timing circuit and said tap switch for starting said timing circuit to run upon tap-switch actuation when preceded by selector-switch actuation; and
   control means connected to said circuit means for disabling said enabling circuit during running of said timing circuit.

4. An indicating system for aiding in the controlling and supervising the dispensing of predeterminable amounts of a medium under pressure, from a storage tank by means of a dispensing tap, comprising:
   a tap switch means connected to the tap and actuated whenever the tap for dispensing a medium under pressure is being actuated;
   an overdraw registration means including an enabling circuit connected to be operated by said tap switch when actuated;
   a timing circuit connected in circuit for operation by said tap switch;
   first control means operatively connected to said timing circuit for preparing operation thereof; and
   second control means connected to be operated by said timing circuit when prepared by said first control means for disabling said enabling circuit for a predetermined period of time.

5. An indicating system for aiding in the controlling and supervising the dispensing of predeterminable amounts of a medium under pressure, from a storage tank by means of a dispensing tap, comprising:
   a tap switch means connected to the tap and actuated whenever the tap for dispensing a medium under pressure is being actuated;
   an overdraw counter including an enabling circuit connected to be operated by said tap switch when actuated;
   means for generating a source of timed electrical pulses connectible through said enabling circuit to said overdraw counter upon tap-switch actuation;
   a timing circuit connected in circuit with said tap switch for operation by said tap switch;
   first control means connected to said timing circuit for resetting said timing circuit to zero; and
   second control means operated by said timing circuit and said first control means for disabling said enabling circuit for a predetermined period of time.

6. An indicating system for aiding in the controlling and supervising the dispensing of predeterminable amounts of a medium under pressure, from a storage tank by means of a dispensing tap, comprising:
   a tap switch means connected to the tap and actuated whenever the tap for dispensing a medium under pressure is being actuated;
   an overdraw counter including an enabling circuit connected to be operated by said tap switch when actuated;
   first means for generating a source of timed electrical pulses connectible through said enabling circuit to said overdraw counter upon tap-switch actuation;
   a regular counter;
   second means for generating an electrical pulse source;
   a timing circuit connected in circuit for operation by said tap switch;
   first control means connected to said timing circuit for resetting said timing circuit to zero; and second control means connected to be operated by said timing circuit for disabling said overdraw counter and connecting said regular counter to said second pulse source generating means for a predetermined period of time.

7. An indicating system for aiding in the controlling and supervising the dispensing of predeterminable amounts of a medium under pressure, from a storage tank by means of a dispensing tap, comprising:
- a tap switch means connected to the tap and actuated whenever the tap for dispensing a medium under pressure is being actuated;
- an overdraw counter including an enabling circuit connected to be operated by said tap switch when actuated;
- means for generating a source of timed electrical pulses connectible through said enabling circuit to said overdraw counter upon tap-switch actuation;
- a time-interval selector;
- control means connected to said time-interval selector and being responsive to a completed selection; and
- means operatively connecting said tap switch to said control means for disabling said enabling circuit during a selected period of time to commence after tap-switch actuation.

8. An indicating system for aiding in the controlling and supervising the dispensing of predeterminable amounts of a medium under pressure, from a storage tank by means of a dispensing tap, comprising:
- a tap switch means connected to the tap and actuated whenever the tap for dispensing a medium under pressure is being actuated;
- an overdraw registration means;
- means for generating an electrical pulse source;
- switching means connected to and operated by said tap switch for connecting said overdraw registration means to said pulse source upon tap-switch actuation;
- a time-interval selector; and
- means connected to said selector and being responsive to any time-interval selection for disabling said switching means for a selected time interval upon actuation of said tap switch.

9. An indicating system for aiding in the controlling and supervising the dispensing of predeterminable amounts of a medium under pressure, from a storage tank by means of a dispensing tap, comprising:
- a first counter and a second counter;
- means for generating a first and a second electrical pulse source;
- a tap switch means connected to the tap and actuated concurrently with the dispensing of a medium under pressure;
- first switching means connected in circuit with and actuated by said tap switch for connecting said first pulse source to said first counter upon actuation of said tap switch;
- a time switch; and
- second switching means connected to and operated by said time switch for connecting said second pulse source in circuit with said second counter upon tap-switch actuation, thereby disabling said first switching means for a period of time as determined by said time switch.

10. An indicating system for aiding in the controlling and supervising the dispensing of predeterminable amounts of a medium under pressure, from a storage tank by means of a dispensing tap, comprising:
- a tap switch means connected to the tap and actuated whenever the tap for dispensing a medium under pressure is being actuated;
- an overdraw counter including an enabling circuit operated by said tap switch when actuated;
- means for generating a source of timed electrical pulses connectible through said enabling circuit to said overdraw counter upon tap-switch actuation;
- first circuit means for overriding said enabling circuit;
- a timer;
- a selector switching circuit connected to said timer and said first circuit means for enabling said timer and said first circuit means;
- second circuit means for connecting said tap switch in circuit with said selector switching circuit for concurrently starting said timer and actuating said enabled first circuit means; and
- third circuit means for connecting said timer in circuit with said first circuit means for disabling said first circuit means after a predetermined period of time as determined by said timer.

11. An indicating system for aiding in the controlling and supervising the dispensing of predeterminable amounts of a medium under pressure, from a storage tank by means of a dispensing tap, comprising:
- a tap switch means connected to the tap and actuated whenever the tap for dispensing a medium under pressure is being actuated;
- an overdraw counter including an enabling circuit connected to be operated by said tap switch when actuated;
- means for generating a source of timed, electrical pulses connectible through said enabling circuit to said overdraw counter upon tap-switch actuation;
- a second counter;
- first circuit means for connecting said tap switch in circuit with said second counter thereby actuating said second counter for a predetermined period of time and disabling said enabling first circuit means; and
- second circuit means for enabling said enabling circuit after said predetermined period of time as determined by said first circuit means has elapsed.

12. An indicating system for aiding in the controlling and supervising the dispensing of predeterminable amounts of a medium under pressure, from a storage tank by means of a dispensing tap, comprising:
- a tap switch means connected to the tap and actuated whenever the tap for dispensing a medium under pressure is being actuated;
- means for generating electrical pulses; a counter selectively connectible to said pulse generating means upon actuation of said tap switch;
- a preparatory circuit operatively interposed between said tap switch and said counter;
- a timer circuit connected to said preparatory circuit and being started upon actuation of said tap switch and disabling said preparatory circuit after a predetermined time has elapsed; and
- an overdraw registering means connected to said tap switch for actuation by said tap switch whenever said preparatory circuit is disabled.

13. An indicating system for aiding in the controlling and supervising the dispensing of predeterminable amounts of a medium under pressure, from a storage tank by means of several taps, comprising:
- a plurality of tap switches individually connected to said taps and being actuated whenever the respectively associated tap is being actuated;
- an overdraw counter;
- means for generating a source of timed electrical pulses;
- enabling circuit means for interconnecting said pulse source and said overdraw counter upon actuation of at least one of said tap switches;
- selection means including a timing circuit connected to said tap switches and activatable by either tap switch;
- control means responsive to actuation of said selection means and to a succeeding actuation of either tap switch to disable said enabling means; and
- means connected to said tap switches for overriding the disabling of said enabling means upon concurrent actuation of at least two of said tap switches.

14. an indicating system for aiding in the controlling and supervising the dispensing of predeterminable amounts of a medium under pressure, from a storage tank by means of a dispensing tap, comprising:
- a tap switch means connected to the tap and actuated whenever the tap for dispensing a medium under pressure is being actuated;
- regularly dispensing registration means and overdraw registration means;
- a timed relay governing two alternative switching paths from said tap switch to either registration means;
- first control means for said relay, and governed by said tap switch for having said relay provide a switching path between the tap switch and overdraw registration means;
- a time selector unit; and
- second control means responsive to the selective actuation of said time selector unit and controlling said relay to provide for the alternative switching path upon tap-switch actuation, thereby overriding said first control means.

15. An indicating system for aiding in the controlling and supervising of the dispensing of predeterminable amounts of a medium under pressure, from a storage tank by means of a dispensing tap, comprising:
- an overdraw counter including an operating contact and an enabling circuit, said counter being actuated upon actuation of said operating contact when enabled by said enabling circuit;
- a constant speed motor;
- a cam driven by said motor and governing said operating contact;
- a tap switch connected in circuit with said enabling circuit and being actuated whenever the tap for dispensing a medium under pressure is being actuated, thereby enabling said operating contact to actuate said counter;
- a selector switch; a timing circuit connected to be operated by said selector switch for returning same to zero position and for selecting a time interval;
- circuit means interconnecting said timing circuit and said tap switch for starting said timing circuit to run from said zero position for the selected time interval upon tap-switch actuation when preceded by selector-switch actuation; and
- control means connected to said circuit means for disabling said enabling circuit during running of said timing circuit.

16. An indicating system for aiding in the controlling and supervising the dispensing of predeterminable amounts of a liquid under pressure, from a storage tank by means of a dispensing tap, comprising:
- a tap switch means connected to the tap and actuated whenever the tap for dispensing the liquid under pressure is being actuated;
- a counter including an enabling circuit operated by said tap switch when actuated;
- means for generating a source of timed electrical pulses connectible through said enabling circuit to said counter upon tap-switch actuation; and a timing circuit connected in circuit to said tap switch and being activated upon actuation of said tap switch to temporarily disable said enabling circuit for a predetermined period of time.

References Cited by the Examiner
UNITED STATES PATENTS

| | | | |
|---|---|---|---|
| 2,006,882 | 7/1935 | Cleveland et al. | 200—61.86 X |
| 2,060,674 | 11/1936 | Hicks | 222—26 X |
| 3,038,638 | 6/1962 | Notter | 222—26 |
| 3,099,366 | 7/1963 | Reilly | 222—26 |

M. HENSON WOOD, Jr., *Primary Examiner.*

HADD S. LANE, *Examiner.*